US006648610B2

(12) United States Patent

Williams

(10) Patent No.: US 6,648,610 B2
(45) Date of Patent: Nov. 18, 2003

(54) FUEL INJECTION SYSTEM WITH STRUCTURALLY BIASED RELIEF VALVE

(75) Inventor: Anthony Williams, Isleworth (GB)

(73) Assignee: Delphi Technologies, Inc., Troy, MI (US)

( * ) Notice: Subject to any disclaimer, the term of this patent is extended or adjusted under 35 U.S.C. 154(b) by 48 days.

(21) Appl. No.: 10/108,809

(22) Filed: Mar. 28, 2002

(65) Prior Publication Data

US 2002/0168274 A1 Nov. 14, 2002

(51) Int. Cl.[7] .......................... F04B 49/00; F04B 23/00; G05D 11/00; F02M 37/04; B05B 9/00

(52) U.S. Cl. .................. 417/307; 417/440; 137/115.13; 123/506; 239/124

(58) Field of Search ................................ 417/300, 307, 417/311, 440; 137/115.13; 123/506, 510; 239/533.7, 570, 124, 126, 127

(56) References Cited

U.S. PATENT DOCUMENTS 3,677,256 A * 7/1972 Regneault et al. .......... 123/503
4,804,143 A * 2/1989 Thomas ...................... 239/126
5,662,087 A * 9/1997 McCandless ................ 123/446

FOREIGN PATENT DOCUMENTS

JP 8270530 10/1996

* cited by examiner

*Primary Examiner*—Cheryl J. Tyler
*Assistant Examiner*—Timothy P. Solak
(74) *Attorney, Agent, or Firm*—David P. Wood

(57) ABSTRACT

A fuel system arranged to deliver fuel at high pressure to a fuel injector through a high pressure fuel line defined, at least in part, within first and second housing parts of a pressure relief valve arrangement. The first and second housing parts define first and second separable valve surfaces respectively. A clamping arrangement is provided for applying a clamping load to the first and second housing parts so as to urge first and second valve surfaces respectively thereof into substantially sealing engagement. The clamping arrangement is arranged to permit separation of the first and second valve surfaces in the event that fuel pressure within the high pressure fuel line exceeds a predetermined amount, thereby to permit fuel within the high pressure fuel line to flow to a region of relatively low pressure to relieve fuel pressure within the high pressure fuel line.

13 Claims, 3 Drawing Sheets

FUEL INJECTION SYSTEM WITH STRUCTURALLY BIASED RELIEF VALVE

FIELD OF THE INVENTION

The present invention relates to a fuel system for delivering fuel under high pressure to a cylinder of an associated compression ignition internal combustion engine. In particular, but not exclusively, the invention relates to a fuel pump arranged to deliver fuel to an injector for delivering fuel to a cylinder or other combustion space of the associated engine.

BACKGROUND OF THE INVENTION

In a known fuel system for an internal combustion engine, a fuel pump for pressurising fuel to high pressure is arranged to deliver fuel through a high-pressure fuel line to a fuel injector. The fuel pump may take the form of a unit pump in which a spill valve for controlling communication between a pump chamber and a low pressure drain is integrally formed within a main pump housing. In addition, or alternatively, the injector may be integrally formed with the fuel pump in a unit pump/injector arrangement. The injector typically includes a valve needle which is engageable with a valve seating to control the injection of fuel into the engine. In use, movement of the valve needle away from its seating permits fuel to flow from an injector delivery chamber, through an injector outlet opening, into a cylinder of the associated engine.

In such fuel systems, it is thought to be desirable to limit the pressure of fuel within the system in order to protect the component parts of the pump and/or the injector. In the event that a fault occurs in the fuel system, or in the event of system failure, exposure of the components to excessively high fuel pressures can result in irreparable damage to the component parts. Additionally, in order to maximize fuel pressures under normal engine operating conditions, it may be desirable to choose system parameters which produce fuel pressures in excess of a safe level at extreme engine running conditions. In such circumstances, it is also desirable for the pressure of fuel within the system to be limited.

SUMMARY OF THE INVENTION AND ADVANTAGES

According to a first aspect of the present invention, there is provided a fuel system which is arranged to deliver fuel at high pressure to a fuel injector through a high pressure fuel line, the fuel system including a pressure relief valve arrangement for relieving fuel pressure within the high pressure fuel line, wherein the pressure relief valve arrangement includes:

a first housing part defining a first valve surface and a second housing part defining a second valve surface, wherein the high pressure fuel line is defined, at least in part, within the first and second housing parts and wherein the first valve surface is engageable with but separable from the second valve surface, clamping means for applying a clamping load to at least one of the first and second housing parts so as to urge the first and second valve surfaces into substantially sealing engagement, wherein the clamping means is arranged to permit separation of the first and second valve surfaces, against the clamping load, in the event that fuel pressure within the high pressure fuel line exceeds a predetermined amount, thereby to permit fuel pressure within the high pressure fuel line to be relieved.

In the event that fuel pressure within the high pressure line exceeds a predetermined maximum level, forces due to high fuel pressure will tend to separate the first and/or second housing parts and are sufficient to overcome the clamping load applied by the clamping means, thereby permitting a degree of separation between the first and second housing parts. Under such circumstances, fuel within the high-pressure fuel line is able to leak between the first and second valve surfaces to a low-pressure drain or reservoir, thereby causing fuel pressure within the high pressure fuel line to be reduced. In this way, any increase in fuel pressure within the fuel system, which may otherwise cause damage to the component parts of the system, can be avoided.

The fuel system may take the form of a fuel pump for delivering fuel to the injector. For example, the fuel system may take the form of a unit fuel pump.

The fuel system may also include the injector. For example, the fuel system may include a fuel pump and a fuel injector which are integrally formed in a unit pump/injector arrangement. It will be appreciated, however, that the fuel system need not include the injector.

In a preferred embodiment, at least one of the first and second valve surfaces is provided with a relief which is sealingly engageable with the other of the first and second surfaces upon application of the clamping load, the relief being separable from said other of the first and second valve surfaces in the event that fuel pressure within the high pressure fuel line exceeds the predetermined amount. Preferably, the relief on the surface may take the form of a projection of annular form or may comprise two or more annular projections.

The relief is preferably shaped to define a first area which is exposed to fuel pressure within the high pressure fuel line, the first area being selected to ensure separation of the first and second valve surfaces occurs at the required, maximum fuel pressure for a given clamping load.

In one embodiment of the invention, the first valve surface is provide with a first relief and the second valve surface is provided with a second relief, the first and second reliefs being shaped to sealingly engage one another upon application of the clamping load and being separable in the event that fuel pressure within the high pressure fuel line exceeds the predetermined amount.

This arrangement is particularly advantageous if it is necessary for drillings, passages or other components to be accommodated within the first and/or second housing parts.

In a preferred embodiment, the relief provided on the first or second valve surface defines, together with the other of the first and second valve surfaces, a restricted clearance through which fuel flows from the high pressure fuel line to a region of low pressure at a restricted rate when the first and second valve surfaces are caused to separate.

Preferably, the clamping load is applied by means of a cap nut. The cap nut preferably forms at least a part of the clamping means for applying the clamping load to the second housing part. Conveniently, the second housing part may take the form of an adapter plate forming part of the fuel pump.

According to a further aspect of the present invention, there is provided a pressure relief valve arrangement for use in a fuel system as herein described, comprising first and second housing parts which define, at least in part, a high pressure fuel line, first and second valve surfaces being defined by the first and second housing parts respectively and being shaped for sealing engagement with one another upon application of the clamping load by the clamping means, and being separable from one another in the event that fuel pressure within the high pressure fuel line exceeds the predetermined amount.

According to a still further aspect of the invention, there is provided a fuel pump arranged to deliver fuel at high pressure to a fuel injector through a high pressure fuel line, the fuel pump comprising a pressure relief valve arrangement for relieving fuel pressure within the high pressure fuel line, including:

a first housing part defining a first valve surface and a second housing part defining a second valve surface, wherein the high pressure fuel line is defined, at least in part, within the first and second housing parts and wherein the first valve surface is engageable with but separable from the second valve surface, clamping means for applying a clamping load to the first and second housing parts so as to urge the first and second valve surfaces into substantially sealing engagement, wherein the clamping means is arranged to permit separation of the first and second valve surfaces, against the clamping load, in the event that fuel pressure within the high pressure fuel line exceeds a predetermined amount, thereby to permit fuel within the high pressure fuel line to flow to a region of relatively low pressure to relieve fuel pressure within the high pressure fuel line.

BRIEF DESCRIPTION OF THE DRAWINGS

The invention will be described, by way of example, with reference to the accompanying drawings, in which.

DETAILED DESCRIPTION OF THE PREFERRED EMBODIMENT

Figure 1:
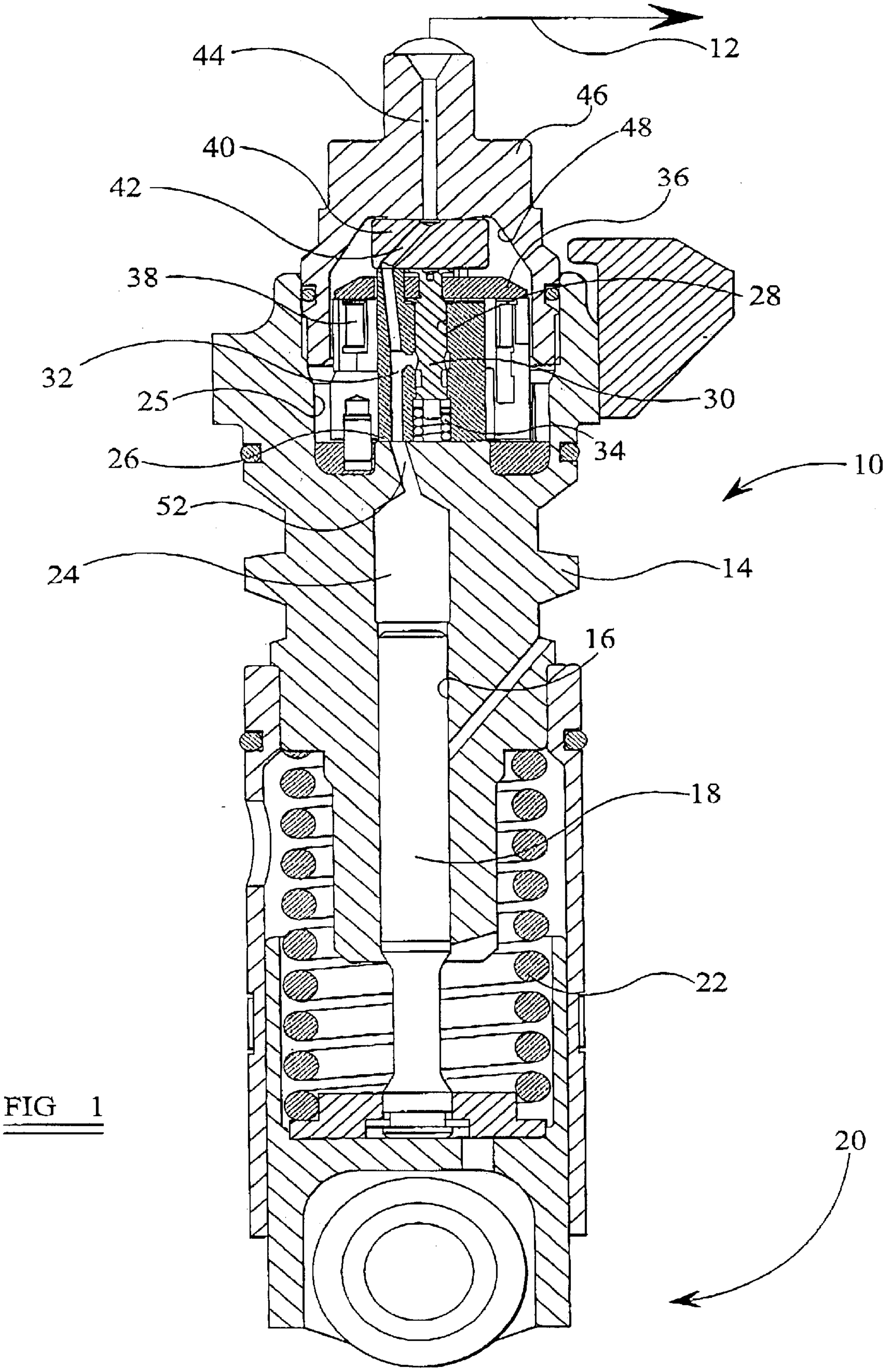
FIG. 1 is a sectional view of a fuel pump in accordance with an embodiment of the present invention.
Figure 2:
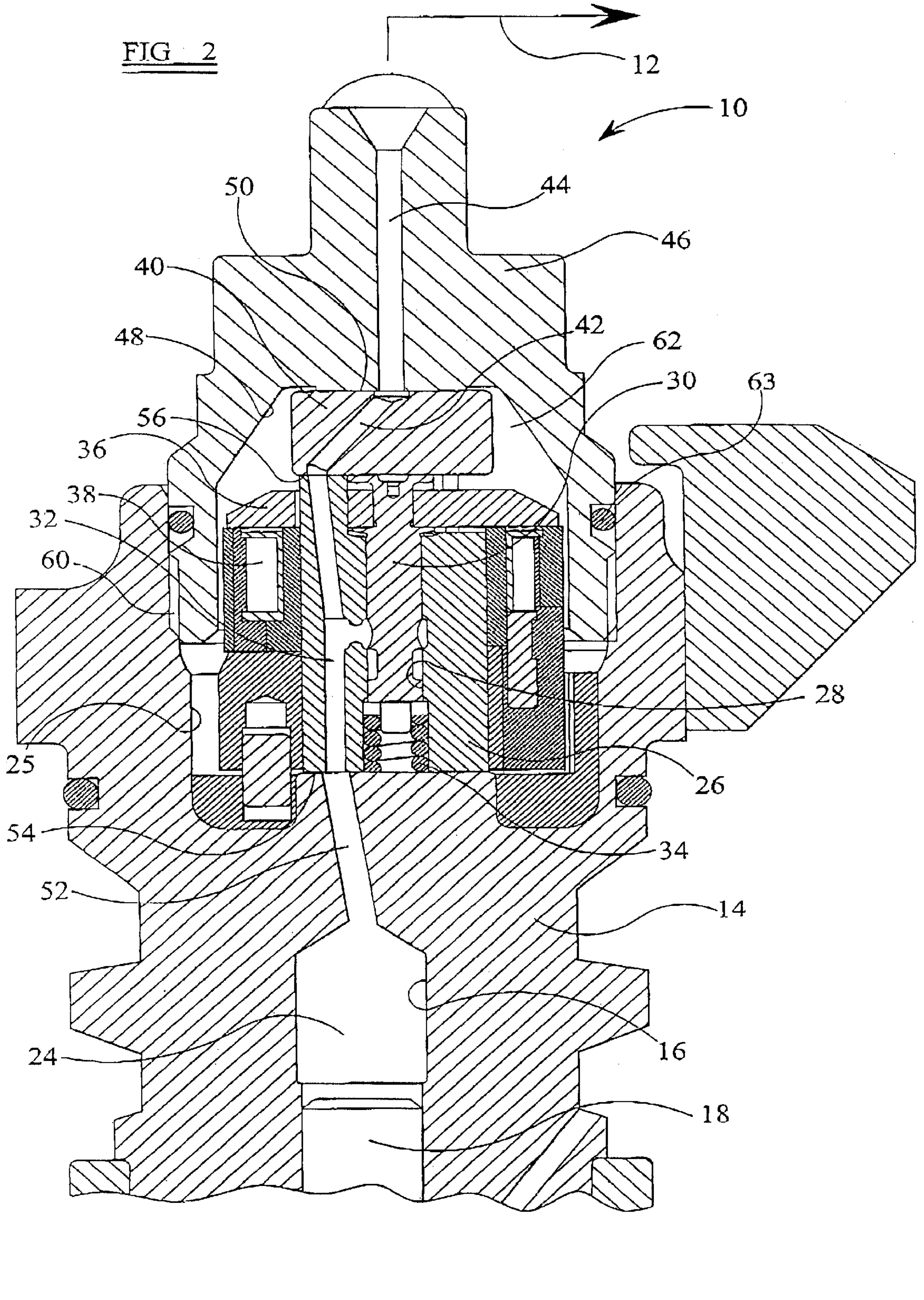
FIG. 2 is an enlarged sectional view of a part of the unit pump shown in FIG. 1, FIGS. 3(*a*) and 3(*b*) show views of a part of the fuel pump in FIGS. 1 and 2.

Referring to FIGS. 1 and 2, there is shown a unit fuel pump, referred to generally as 10, forming part of a fuel system for delivering fuel under high pressure to an associated compression ignition internal combustion engine. The fuel pump has an outlet which communicates through a high-pressure fuel line 12 with the inlet of a fuel injector (not shown) forming part of the fuel system. Typically, the fuel injector is of the type comprising a valve needle which is slideable within a bore provided in a nozzle body and engageable with a valve seating to control fuel delivery through a fuel injector outlet into an engine cylinder or other combustion space of an associated engine. The fuel system is conveniently controlled electronically by means of an engine control unit which receives signals from a plurality of sensors associated with the engine and which monitor various engine operating parameters such as, for example, engine speed, position and temperature. The signals supplied to the control unit by the sensors are used to control the operation of the fuel system to control the pressure of fuel supplied to the injector and the timing at which the injection of fuel into the engine cylinder takes place.

The pump 10 includes a pump housing 14 defining a first bore 16 within which a pumping plunger 18 is reciprocable under the action of a cam and tappet arrangement, referred to generally as 20, which acts against the action of a return spring 22. The first bore 16 and an end surface of the pumping plunger 18 define a pump chamber 24 within which fuel is pressurized, in use, upon reciprocal movement of the pumping plunger 18 within the bore 16, as will be described in further detail hereinafter.

At the end of the pump housing 14 remote from the cam and tappet arrangement 20, the pump housing 14 is provided with a first recess 25 of generally cylindrical form within which a valve housing 26 is arranged. The valve housing 26 is provided with a through bore 28 within which a pressure control valve member 30 is slideable. The through bore 28 provided in the valve housing 26 is shaped to define a seating surface with which a region of the pressure control valve member 30 is engageable to control communication between a first passage 32 defined within the valve housing 26 and a low pressure fuel reservoir or drain (not shown). The first passage 32 communicates, at one end, with the pump chamber 24 and forms part of a high pressure fuel line through which fuel is delivered from the pump chamber 24 to the outlet of the fuel pump 10, as will be described in further detail hereinafter. A further spring 34 is engaged between the pressure control valve member 30 and a surface of the first recess 25 provided in the pump housing 14, the further spring 34 being arranged to bias the pressure control valve member 30 towards a position in which the pressure control valve member 30 is spaced away from the seating surface to permit communication between the first passage 32 and the low pressure drain.

The end of the pressure control valve member 30 remote from the further spring 34 carries an armature 36 which is movable under the influence of a magnetic field generated, in use, by an actuator 38. The actuator 38 and the armature 36 are arranged such that energisation of the actuator 38 causes movement of the pressure control valve member 30 into engagement with the seating surface, against the action of the further spring 34, so as to break communication between the first passage 32 and the low pressure drain.

The pump housing 14 is provided with a pump chamber outlet passage 52 which communicates, at one end, with the pump chamber 24, the other end of the passage 52 communicating with the first passage 32 provided in the valve housing 26. The end of the valve housing 26 remote from the pump housing 14 abuts an adapter plate 40 within which a second passage 42 is defined. The second passage 42 communicates, at one end, with the first passage 32 provided in the valve housing 26 and, at its other end, with a further passage 44 provided in a cap nut 46. The further passage 44 delivers fuel to the outlet of the pump 10. The outlet passage 52 provided in the pump housing 14, the first passage 32 provided in the valve housing 26, the second passage 42 provided in the adapter plate 40 and the further passage 44 provided in the cap nut 46 therefore together define a high pressure fuel line through which fuel at high pressure flows from the pump chamber 24 to the outlet of the pump 10, and hence to the inlet of the injector, when the pressure control valve member 30 is in engagement with its seating to break communication between the high pressure fuel line and the low pressure drain.

The cap nut 46 is received within the first recess 25 defined in the pump housing 14 and is in screw threaded engagement with the pump housing 14 through a screw thread connection 60. The cap nut 46 is arranged to apply a clamping load to the adapter plate 40, the valve housing 26 and the pump housing 14 which serves to secure the components in position. The cap nut 46 defines a recessed surface 48 of part-cylindrical form which defines, in part, a chamber or region 62 at low pressure. Appropriate seals 63 are provided to provide a substantially fluid tight seal between the pump housing 14 and the outer surface of the cap nut 46.

The recessed surface 48 of the cap nut 46 is in abutment with an upper surface (in the illustration shown) of the adapter plate 40 to define a first interface 50. A second interface 54 is defined between the valve housing 26 and the pump housing 14 in the region of communication between the outlet passage 52 and the first passage 32. A third interface 56 is defined between an end surface of the valve housing 26 remote from the outlet passage 52 and a surface of the adapter plate 40 in the region of communication between the first and second passages 32, 42.

Figure 3A:
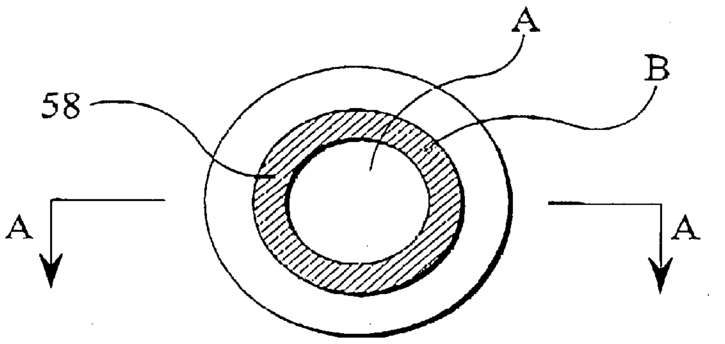
Figure 3B:
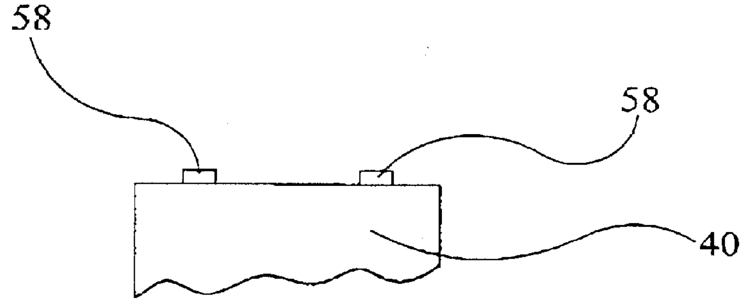

As shown in FIGS. 3(*a*) and 3(*b*), the upper surface of the adapter plate 40 is provided with a relief which defines a projection 58 of annular form. The inner diameter of the annular projection 58 defines a surface area, A, and the projection 58 has a surface area, B which is engageable with the opposing surface of the recessed surface 48 defined by the cap nut 46 in the region of the interface 50. The clamping load applied by the cap nut 46 serves to urge the cap nut 46 into engagement with the projection 58 provided on the adapter plate 40, the adapter plate 40 into engagement with the valve housing 26 and the valve housing 26 into engagement with the pump housing 14 such that substantially fluid tight seals are formed in the region of the first, second and third interfaces 50, 54, 56. Thus, under normal operating conditions, any fuel flowing through the high-pressure fuel line from the pump chamber 24 to the outlet of the pump 10 is unable to leak between the various housing parts to low pressure.

In use, when the actuator 38 is de-energized, the pressure control valve member 30 occupies a position in which it is spaced away from the seating surface defined by the through bore 28 to permit communication between the region of the high pressure fuel line defined by the first passage 32 and the low pressure drain. In such circumstances, movement of the cam and tappet arrangement 20 to cause reciprocal movement of the plunger member 18 within the first bore 16 will cause fuel to be drawn into the pump chamber 24 from the low pressure reservoir, and displaced from the pump chamber 24 to the low pressure reservoir, in a manner which would be familiar to a person skilled in the art.

If the actuator 38 is energized, the pressure control valve member 30 is urged into engagement with the seating surface to break communication between the region of the high pressure fuel line defined by the first passage 32 and the low pressure drain. In such circumstances, movement of the cam and tappet arrangement 20 causes the plunger member 18 to perform a pumping stroke, thereby causing fuel within the pump chamber 24 to be pressurized to a high level. Due to the substantially fluid tight seals between the pump housing 14 and the valve housing 26 in the region of the second interface 54, between the valve housing 26 and the adapter plate 40 in the region of the third interface 56, and between the projection 58 formed on the surface of the adapter plate 40 and the cap nut 46 in the region of the first interface 50, leakage of fuel from the high pressure fuel line is substantially avoided.

Figure 4:
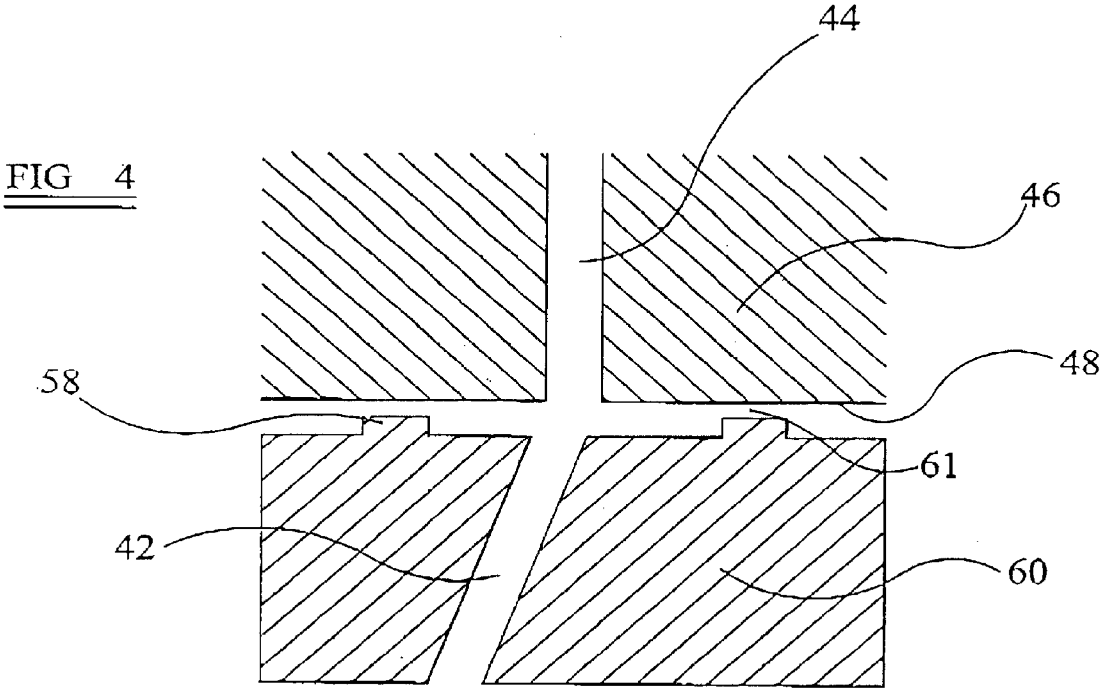
FIG. 4 is an enlarged, exaggerated view of the part of the fuel pump in FIGS. 3(*a*) and 3(*b*).

As illustrated in FIG. 4, in circumstances in which the pressure of fuel within the high pressure fuel line increases beyond a predetermined amount, the projection 58 on the surface of the adapter plate 40 will be caused to separate from the cap nut 46, against the action of the clamping load exerted by the cap nut 46, such that the surface of the projection 58 and the opposing surface of the cap nut 46 together define an annular clearance 61 of restricted flow area through which fuel is able to flow from the high pressure fuel line to the chamber 62 and, hence, to low pressure. In such circumstances, the pressure of fuel within the high-pressure fuel line is relieved. It will therefore be appreciated that the cap nut 46 and the adapter plate 40 form a pressure relief valve arrangement which serves to limit the pressure of fuel within the high pressure fuel line to an acceptable, predetermined level. The cap nut 46 and the adapter plate 40 define respective valve surfaces of the pressure relief valve which, in normal circumstances, are sealingly engaged with one another but which separate in circumstances in which the pressure of fuel within the high pressure fuel line between the pump chamber 24 and the outlet for the pump 10 exceeds an acceptable level. This may occur, for example, if a fault, blockage or failure in the fuel system occurs. The provision of the pressure relief valve ensures any damage to the component parts of the pump and/or the injector which may otherwise occur in the event of such a fault, blockage or failure can be avoided.

The predetermined maximum pressure at which the projection 58 on the surface of the adapter plate 40 separates from the cap nut 46 to open the restricted clearance 61 will be largely determined by the surface area, A, exposed to fuel pressure within the high pressure fuel line and the clamping load exerted by the cap nut 46. The surface area, B, of the projection 58 may affect this predetermined maximum pressure as a result of variable exposure to fuel pressure due to surface irregularities on the recessed surface 48 of the cap nut 46 and/or on the surface of the adapter plate 40. The inner diameter of the annular projection 58 (i.e. the periphery of area A) and the stiffness of the cap nut/adapter plate interface 46, 40 will determine the flow area through the restricted clearance 61 and, together with the additional effect of the length of the restricted clearance 61 (determined by the shape of the surface area B), will determine the rate at which fuel is able to leak from the high pressure fuel line to low pressure. The characteristics of the pressure control arrangement are such that the relationship between leakage flow and fuel line pressure is therefore defined by the surface area A, the periphery of area A, surface area B, the shape of surface area B, the stiffness of the cap nut/adapter plate 46, 40 interface and the clamping load.

It will be appreciated that the relief need not be provided on the surface of the adapter plate 40, but may alternatively be formed on the recessed surface 48 of the cap nut 46.

In a further alternative embodiment of the invention, the recessed surface 48 of the cap nut 46 may also be provided with a corresponding relief which is cooperable with the projection 58 provided on the surface of the adapter plate 40. It may also be convenient to provide reliefs on one or two of the two engageable surfaces at the second and third interfaces 54, 56 between the valve housing 26 and the pump housing 14 and between the adapter plate 40 and the valve housing 26 respectively in view of the other components and/or passages in the vicinity of the second and third interfaces 54, 56. Fuel pressure within the high-pressure fuel line is reduced due to flow through restricted flow paths from two or more regions of the high-pressure line, in the event that fuel pressure within the high-pressure fuel line exceeds the maximum amount.

A pressure control arrangement as hereinbefore described may be provided within any part of a fuel system and is not limited to use in a unit fuel pump, as shown in FIGS. 1 and 2. For example, the pressure control arrangement may be provided within a unit pump/injector or within a fuel injector itself.

It will be appreciated that the relief provided on the surface of the adapter plate 40, or on any one or more of the other surfaces of the pump housing 14 and the valve housing 26, need not take the form of a single annular projection, but may take any form, for example a multiple-lobe form or a multiple area form, which defines the appropriate surface area, A, exposed to fuel pressure within the high pressure fuel line and the appropriate surface area, B, required to give the necessary pressure relief characteristics of the pressure control arrangement. For example, it would be possible to have two or more annular projections forming the relief on a single surface. It will further be appreciated that the clamp arrangement used to provide the clamping load to the adapter plate 40 need not be applied by means of a cap nut, and other clamping means may be employed to provide the required clamping load.

What is claimed is:

1. A fuel system arranged to deliver fuel at high pressure to a fuel injector through a high pressure fuel line, the fuel system including a pressure relief valve arrangement for relieving fuel pressure within the high pressure fuel line, the pressure relief valve arrangement including:

a first housing part defining a first valve surface and a second housing part defining a second valve surface, wherein the high pressure fuel line is defined, at least in part, within the first and second housing parts and wherein the first valve surface is engageable with but separable from the second valve surface; and a clamping arrangement for applying a clamping load to at least one of the first and second housing parts so as to urge the first and second valve surfaces into substantially sealing engagement with one another, wherein the clamping arrangement is arranged to permit separation of the first and second valve surfaces, against the clamping load, in the event that fuel pressure within the high pressure fuel line exceeds a predetermined amount, thereby to relieve fuel pressure within the high pressure fuel line.

2. A fuel system as claimed in claim 1, wherein at least one of the first and second surfaces is provided with a relief which is sealingly engageable with the other of the first and second valve surfaces upon application of the clamping load, the relief being separable from said other of the first and second valve surfaces in the event that fuel pressure within the high pressure fuel line exceeds the predetermined amount.

3. A fuel system as claimed in claim 2, wherein the relief takes the form of one or more projections of annular form.

4. A fuel system as claimed in claim 2, wherein the relief is shaped to define a first area which is exposed to fuel pressure within the high pressure fuel line, the first area being selected to ensure separation of the first and second surfaces occurs at a required predetermined fuel pressure for a given clamping load.

5. A fuel system as claimed in claim 2, wherein the first valve surface is provide with a first relief and the second valve surface is provided with a second relief, the first and second reliefs being shaped to sealingly engage one another upon application of the clamping load and being separable from one another in the event that fuel pressure within the high pressure fuel line exceeds the predetermined amount.

6. A fuel system as claimed in claim 2, wherein the relief provided on the first or second valve surface defines, together with the other of the first and second valve surfaces, a restricted clearance through which fuel flows from the high pressure fuel line to a region of low pressure at a restricted rate when the first and second valve surfaces are caused to separate.

7. A fuel system as claimed in claim 1, wherein the first housing part takes the form of a cap nut forming at least a part of the clamp arrangement for applying the clamping load to the second housing part.

8. A fuel system as claimed in claim 1, wherein the second housing part takes the form of an adapter plate.

9. A fuel system as claimed in claim 1, comprising a fuel pump which is arranged to deliver fuel at high pressure to the injector through the high-pressure fuel line.

10. A fuel system as claimed in claim 9, wherein the fuel pump is a unit fuel pump.

11. A fuel system as claimed in claim 1, comprising a fuel pump which is arranged to deliver fuel at high pressure to the injector, the fuel pump and the injector being integrally formed in a unit pump/injector arrangement.

12. A pressure relief valve arrangement for use in a fuel system as claimed in claim 1, comprising first and second housing parts which define, at least in part, the high pressure fuel line, the first and second valve surfaces being shaped for sealing engagement with one another upon application of the clamping load by the clamping arrangement, and being separable from one another in the event that fuel pressure within the high pressure fuel line exceeds the predetermined amount.

13. A fuel pump arranged to deliver fuel at high pressure to a fuel injector, the fuel pump comprising a pressure relief valve arrangement including first and second housing parts within which is defined, at least in part, a high pressure fuel line through which fuel at high pressure is delivered from a pump chamber of the pump to the injector, the first housing part defining a first valve surface and the second housing part defining a second valve surface which is engageable with but separable from the first valve surface, a clamping arrangement for applying a clamping load to the first and second housing parts so as to urge first and second valve surfaces respectively thereof into substantially sealing engagement with one another, wherein the clamping arrangement is arranged to permit separation of the first and second valve surfaces, against the clamping load, in the event that fuel pressure within the high pressure fuel line exceeds a predetermined amount, thereby to permit fuel within the high pressure fuel line to flow to a region of relatively low pressure to relieve fuel pressure within the high pressure fuel line.

* * * * *